US005820102A

United States Patent [19]

Borland

[11] Patent Number: 5,820,102
[45] Date of Patent: Oct. 13, 1998

[54] PRESSURIZED FLUID STORGE AND TRANSFER SYSTEM INCLUDING A SONIC NOZZLE

[75] Inventor: Robin Neil Borland, McMurray, Pa.

[73] Assignee: Superior Valve Company, Washington, Pa.

[21] Appl. No.: 729,953

[22] Filed: Oct. 15, 1996

[51] Int. Cl.[6] .................... F16K 51/00

[52] U.S. Cl. .................... 251/144; 251/118; 141/3; 141/18

[58] Field of Search .................... 251/129.14, 5, 251/118, 144; 137/551, 572; 141/18, 4, 3; 222/3

[56] References Cited

U.S. PATENT DOCUMENTS

| | | | |
|---|---|---|---|
| 2,551,501 | 5/1951 | MItchell et al. | 137/572 |
| 3,278,728 | 10/1966 | Ragsdale . | |
| 3,665,959 | 5/1972 | Castillon | 137/551 |
| 3,951,379 | 4/1976 | Cornelius | 251/118 |
| 4,434,765 | 3/1984 | Eshelman | 251/129.14 |
| 4,645,174 | 2/1987 | Hicks | 251/5 |
| 5,193,580 | 3/1993 | Wass et al. . | |
| 5,238,030 | 8/1993 | Miller et al. . | |
| 5,259,424 | 11/1993 | Miller et al. . | |
| 5,357,809 | 10/1994 | Vander Heyden . | |
| 5,392,825 | 2/1995 | Mims et al. | 251/118 |
| 5,452,738 | 9/1995 | Borland et al. . | |
| 5,542,459 | 8/1996 | Price et al. . | |
| 5,597,020 | 1/1997 | Miller et al. | 141/95 |
| 5,653,269 | 8/1997 | Miller et al. | 141/4 |

FOREIGN PATENT DOCUMENTS

| | | | |
|---|---|---|---|
| 409401 | 1/1991 | European Pat. Off. . | |
| 634633 | 1/1995 | European Pat. Off. . | |
| 9210296 | 8/1997 | Japan . | |
| WO 9300264 | 1/1993 | WIPO . | |

OTHER PUBLICATIONS

B. S. Massey, “Mechanics of Fluids”, pp. 406 –413.
G.F.C. Rogers & Y. R. Mayhew, “Engineering Thermodynamics”, Chapter 18, pp. 370 –381.

*Primary Examiner*—Denise L. Ferensic
*Assistant Examiner*—John Ball
*Attorney, Agent, or Firm*—Killworth, Gottman, Hagan & Schaeff, L.L.P.

[57] ABSTRACT

A pressurized fluid transfer system is provided comprising a supply storage vessel, a receiver storage vessel, a fluid flow passage extending from the supply storage vessel to the receiver storage vessel, a sonic nozzle comprising a convergent nozzle portion, a divergent nozzle portion, and a nozzle throat positioned between the convergent nozzle portion and the divergent nozzle portion. The nozzle throat defines a minimum flow area orifice having a cross sectional flow area which is smaller than a remainder of flow orifices within the system. Further, a sonic nozzle is provided in a pressurized fluid storage system such that sonic fluid flow into the fluid storage vessel is maintained until the storage vessel is about 90–95% full.

32 Claims, 5 Drawing Sheets

PRESSURIZED FLUID STORGE AND TRANSFER SYSTEM INCLUDING A SONIC NOZZLE

BACKGROUND OF THE INVENTION

The present invention relates to pressurized fluid transfer, storage, and dispensing systems, and more particularly to the use of a sonic nozzle to improve the fill time of a pressurized gas storage container.

Because of environmental concerns and emissions laws and regulations, manufacturers of motor vehicles are searching for a clean burning and cost efficient fuel to use as an alternative to gasoline. Natural gas is one candidate for such a purpose, and many vehicles have been converted to natural gas as a fuel source. Typically, the natural gas is stored on board the vehicle in compressed form in one or more pressurized cylinders.

FIG. 1 illustrates a conventional pressurized fluid transfer system including a vehicle 10 adapted to be powered by compressed natural gas (CNG) and a fluid supply station 11 for supplying a gas under pressure. The fluid supply station 11 includes a low pressure gas input port 13, a compressor 15 for producing a high pressure gas output in a gas line 17, a pair of buffer supply storage vessels 19 coupled to the gas line 17, and a gas supply hose 21 coupling the gas line 17 to a gas dispensing supply nozzle 23. The gas dispensing supply nozzle 23 is designed to engage and disengage a fill valve or fluid inlet port 16 provided in a gas receiving system of the vehicle 10. Preferably, the fluid inlet 16 includes a check valve to prevent gas back flow.

The vehicle includes one or more pressurized storage vessels or cylinders 12, each including a bi-directional valve 14. A suitable bi-directional valve is described in U.S. Pat. No. 5,452,738 to Borland et al., issued Sep. 26, 1995. Each cylinder 12 is designed to be able to withstand nominal working pressures of up to 3600 psi, and the bi-directional valve 14 also is designed to be able to handle those pressures without leakage. The bi-directional valve 14 may be fabricated of brass, steel, stainless steel, or aluminum, and may include plating or other surface treatment to resist corrosion. Upon demand from the engine of the vehicle, the CNG fuel flows along a fuel line 18 to a fuel injection system shown generally at 20. Depending upon the design, the engine may comprise a computer-controlled gaseous fuel injection engine or may be adapted to run on more than one fuel by selectively changing fuel sources.

The rate at which compressed natural gas (CNG) can be supplied to the vehicle storage tanks is of significant concern to motor vehicle manufacturers. The fill time of a conventional pressurized fluid transfer system includes both a sonic phase, where gas enters the storage vessel at a flow rate which is proportional to the speed of sound in the gas, and a subsonic phase, where gas enters the storage vessel at a flow rate which is proportional to a speed below the speed of sound in the gas. In conventional storage and supply systems, the sonic phase converts to the less rapid sub-sonic phase when the pressure in the storage vessel reaches a value which is approximately 50% of the pressure at the fluid inlet port. As a result, in the conventional system, the fill rate reduces significantly when the storage vessel becomes half full, extending the time required to fill the storage tanks.

Accordingly, there is a need for pressurized gas transfer, storage, and dispensing systems which reduce storage vessel fill time. More particularly, there is a need for pressurized gas transfer, storage, and dispensing systems where sonic flow can be preserved well beyond the point at which a gas storage vessel becomes 50% full.

SUMMARY OF THE INVENTION

This need is met by the present invention wherein storage vessel fill time is decreased by utilizing a sonic nozzle in pressurized gas transfer, storage, and dispensing systems, and ensuring that the sonic nozzle is the smallest system flow area orifice. In this manner, sonic fluid flow into the interior of a fluid storage vessel is preserved well beyond the point at which the vessel becomes 50% full.

In accordance with one embodiment of the present invention, a system for receiving and storing a fluid under pressure is provided comprising: a fluid storage vessel defining a fluid storage volume; a storage vessel valve defining a fluid flow passage extending from a valve inlet port to a storage vessel port, the storage vessel valve being operative to permit fluid flow to the storage vessel through the storage vessel port, the fluid flow passage defining a minimum flow area orifice and at least one additional orifice; and a sonic nozzle positioned in the fluid flow passage.

The fluid flow passage may comprise a passage body coupled to a sonic nozzle body, wherein the sonic nozzle body defines the sonic nozzle and the sonic nozzle body is an attachment to the passage body. The sonic nozzle body may be in the form of a threaded fitting and the sonic nozzle may extend along the longitudinal axis of the threaded fitting. The sonic nozzle preferably defines the minimum flow area orifice and the at least one additional orifice comprises a remainder of fluid flow passage orifices, wherein the minimum flow area orifice has a cross sectional flow area which is smaller than a cross sectional flow area defined by the at least one additional orifice. The sonic nozzle preferably includes a convergent nozzle portion, a divergent nozzle portion, and a sonic nozzle throat positioned between the convergent nozzle portion and the divergent nozzle portion. The sonic nozzle throat may have a diameter of approximately 0.100" to 0.125" (2.54 mm to 3.175 mm) to facilitate fluid flow through the nozzle at a rate of between approximately 25 and 50 lb/min (0.189 and 0.378 kg/s), a rate which is comparable to the current fuel delivery rate range of public CNG filling stations.

The fluid storage vessel contains a fluid at a storage pressure, the valve inlet port receives a fluid at an inlet pressure, and the sonic nozzle is preferably designed to maintain sonic fluid flow into the fluid storage vessel at least where the storage pressure is greater than 50% of the inlet pressure and preferably at least where the inlet pressure is about 5 to 10% higher than the storage pressure.

In accordance with another embodiment of the present invention, a system for receiving and storing a fluid under pressure is provided comprising: a fluid flow passage extending from a fluid inlet port to a fluid outlet port, the fluid inlet port being designed to engage and disengage a fluid dispensing port, and the fluid flow passage defining a minimum flow area orifice and at least one additional orifice; a uni-directional valve positioned in the fluid flow passage and operative to permit fluid flow in a downstream direction from the inlet port to the outlet port and to restrict fluid flow in an upstream direction from the outlet port to the inlet port; a fluid storage vessel positioned downstream from the fluid flow passage; and a sonic nozzle positioned in the fluid flow passage. The sonic nozzle preferably defines the minimum flow area orifice, wherein the at least one additional orifice comprises a remainder of fluid flow passage orifices, and wherein the minimum flow area orifice has a cross sectional flow area which is smaller than a cross sectional flow area defined by the at least one additional orifice.

In accordance with yet another embodiment of the present invention, a system for receiving, storing, and dispensing a fluid under pressure is provided comprising: a bi-directional fluid flow passage having a fluid inlet port and a storage vessel port and defining at least one cross sectional flow area; a fluid storage vessel defining a fluid storage volume; a bi-directional valve positioned in the bi-directional fluid flow passage and operative to permit bi-directional fluid flow to and from the storage vessel through the storage vessel port; and a sonic nozzle positioned in the bi-directional fluid flow passage.

The sonic nozzle preferably defines a minimum flow area orifice, and wherein the minimum flow area orifice has a cross sectional flow area which is smaller than the at least one cross sectional flow area defined by the bi-directional fluid flow passage. The bi-directional fluid flow passage may further comprise a fluid outlet port. The bi-directional valve may comprise a bi-directional solenoid valve.

According to yet another embodiment of the present invention, a system for supplying a fluid under pressure is provided comprising: a supply storage vessel; a fluid flow passage extending from the supply storage vessel to a fluid dispensing port, the fluid flow passage including a minimum area flow passage orifice, the fluid dispensing port being adapted to dispense fluid to a downstream fluid receiving system, and the downstream fluid receiving system including a minimum area receiving system orifice; and a sonic nozzle positioned in the fluid flow passage, the sonic nozzle including a convergent nozzle portion, a divergent nozzle portion, and a sonic nozzle throat positioned between the convergent nozzle portion and the divergent nozzle portion, the sonic nozzle throat defining a minimum sonic nozzle flow area, wherein the minimum sonic nozzle flow area is smaller than respective flow areas defined by the minimum area flow passage orifice and the minimum area receiving system orifice.

The fluid dispensing port is preferably designed to engage and disengage a fluid inlet port. The fluid flow passage may comprise a system piping component and a sonic nozzle body provided in a section of the piping component.

According to yet another embodiment of the present invention, a pressurized fluid transfer system is provided comprising: a supply storage vessel; a receiver storage vessel; a fluid flow passage extending from the supply storage vessel to the receiver storage vessel and defining a minimum flow area orifice and at least one additional orifice, wherein the at least one additional orifice comprises a remainder of fluid flow passage orifices; a sonic nozzle comprising a convergent nozzle portion, a divergent nozzle portion, and a nozzle throat positioned between the convergent nozzle portion and the divergent nozzle portion, the nozzle throat defining the minimum flow area orifice, and the minimum flow area orifice having a cross sectional flow area which is smaller than the at least one additional orifice.

The fluid flow passage may comprise a fluid dispensing port and a fluid inlet port, wherein the fluid dispensing port is designed to engage the fluid inlet port.

Accordingly, it is an object of the present invention to decrease storage vessel fill time through the utilization of a sonic nozzle in fluid supply, transfer, and/or storage systems wherein the sonic nozzle throat defines the minimum system flow area orifice. For example, where a filling station is designed to restrict flow above 25 lb/min (0.189 kg/s), the sonic nozzle is provided having a minimum cross sectional flow area of 0.100" (2.54 mm). Similarly, where a filling station is designed to restrict flow above 50 lb/min (0.378 kg/s), the sonic nozzle is provided having a minimum cross sectional flow area of 0.125" (3.175 mm).

DETAILED DESCRIPTION OF THE INVENTION

Figure 2:
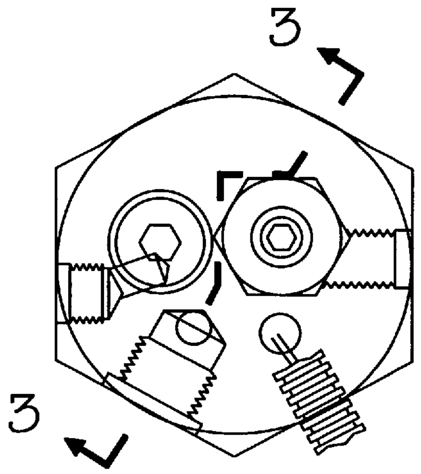
FIG. 2 is a top view of a storage vessel valve utilized in a system for receiving and storing a fluid under pressure according to one embodiment of the present invention.
Figure 3:
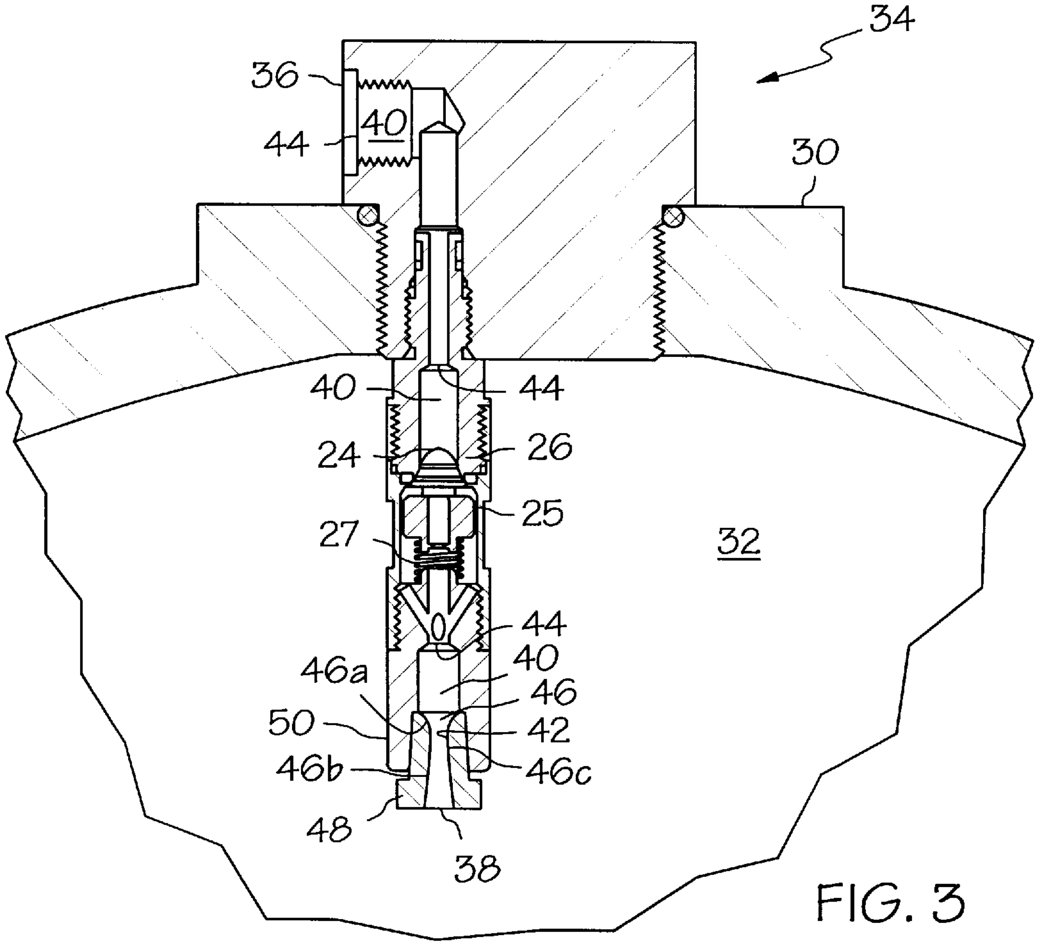
FIG. 3 is an illustration, partially broken away, of a system for receiving and storing a fluid under pressure according to one embodiment of the present invention including a cross sectional view of the storage vessel valve of FIG. 2 taken along line 3—3.

Referring now to FIGS. 2 and 3, a system for receiving and storing a fluid under pressure is illustrated. A fluid storage vessel 30, shown partially, defines and bounds a fluid storage volume 32. As will be appreciated by one skilled in the art of pressurized fluid storage, the vessel 30 has dimensions which are a function of particular fluid storage requirements and is constructed of material having sufficient strength to contain a fluid under pressure. A storage vessel valve 34 defines a fluid flow passage 40 extending from a valve inlet port 36 to a storage vessel port 38. The storage vessel valve 34 includes a poppet 24 mounted to poppet guide 25. The poppet guide 25, and consequently the poppet 24, are urged towards a valve seat 26 as a result of force exerted upon the poppet 24 and the poppet guide 25 by a spring 27. When the pressure within the storage vessel 32 is equal to or greater than the pressure on the inlet side of the poppet 24, the force of the spring 27 will cause the poppet 24 to seal against the valve seat 26 and block the fluid flow passage 40. As the pressure on the inlet side of the poppet 24 becomes greater than the pressure within the storage vessel 30, the resulting pressure differential forces the poppet 24 away from the valve seat 26 to open the fluid flow passage 40. When the fluid flow passage 40 is open, fluid may flow to the interior of the storage vessel 30 through the storage vessel port 38.

The fluid flow passage 40 defines a minimum flow area orifice 42 and a plurality of additional flow orifices 44. The minimum flow area orifice 42 has a cross sectional flow area which is smaller than a cross sectional flow area defined by the remainder of fluid flow passage orifices, i.e., the minimum flow area orifice is the smallest flow passage orifice. A sonic nozzle 46, including a sonic nozzle body 48 defining the sonic nozzle 46, is positioned in the fluid flow passage 40 and defines the minimum flow area orifice 42. The sonic nozzle body 48 is coupled to a passage body 50 in the form of a removable passage body attachment. Specifically, the sonic nozzle body 48 is in the form of a threaded fitting which engages complementary threads formed in the passage body 50.

Figure 8:
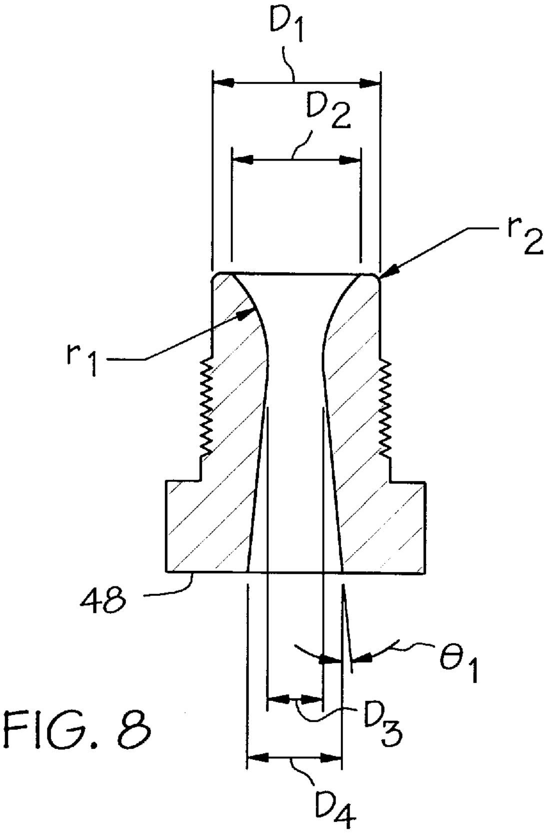
FIG. 8 is a cross sectional view of a sonic nozzle according to the present invention.

The sonic nozzle 46 includes a convergent nozzle portion 46*a*, a divergent nozzle portion 46*b*, and a sonic nozzle throat 46*c* positioned between the convergent nozzle portion 46*a* and the divergent nozzle portion 46*b*. In one embodiment of the present invention, the sonic nozzle throat 46*c* has a diameter d of approximately 0.100" to 0.125" (2.54 mm to 3.175 mm) and a corresponding cross sectional area a which is $\pi(\frac{1}{2}d)^2$. A sonic nozzle, also known as a de Laval nozzle, accelerates a fluid to a velocity equal to the local velocity of sound in the fluid. As will be appreciated by one skilled in the art, specific sonic nozzle design varies as a function of the pressure conditions at the sonic nozzle inlet and the required mass flow rate of the system. FIG. 8 is a detailed illustration of a sonic nozzle body 48 suitable for use with the present invention where approximate dimensions are as follows: $D_1$=0.370" (0.940 cm), $D_2$=0.312" (0.792 cm), $D_3$=0.125" (0.318 cm), $D_4$=0.213" (0.541 cm), $r_1$=0.25" (0.64 cm), $r_2$=0.010" (0.254 cm), $\theta_1$=5°.

Referring back now to FIG. 3, in operation, the fluid dispensing system supplies a fluid to the fluid inlet port 36 at a fluid inlet pressure and the downstream fluid storage vessel 30 contains a fluid at a storage pressure. The storage pressure increases as fluid flows into the storage vessel 30. The sonic nozzle 42 is designed to maintain sonic fluid flow into the interior of the fluid storage vessel where the increasing storage pressure is less than 50% of the inlet pressure and further where the storage pressure exceeds 50% of the inlet pressure. Specifically, as the storage pressure increases, sonic flow is maintained until the inlet pressure is merely about 5 to 10% higher than the storage pressure. Sonic flow is not lost until the storage pressure exceeds about 90–95% of the inlet pressure. In this manner, fill time is minimized because sonic flow into the storage vessel 30 is maintained until the storage vessel 30 is about 90–95% full. It has been found that fill time may be reduced as much as 30% over the time required to fill conventional systems.

Figure 5:
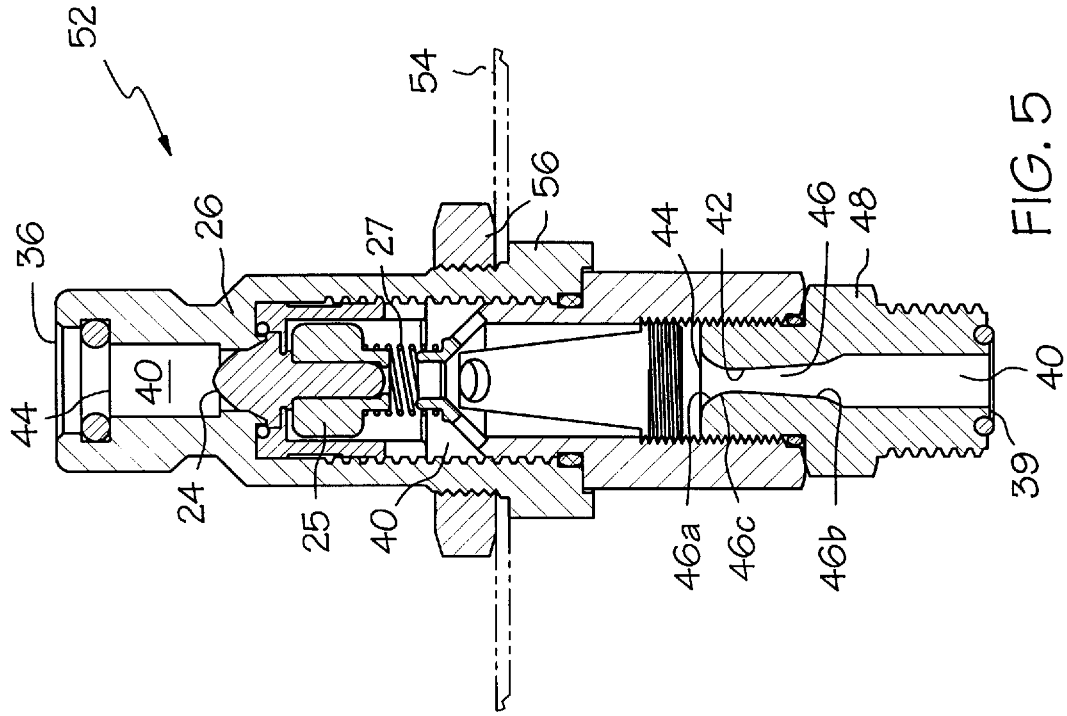
FIG. 5 is a cross sectional view of the system of FIG. 4.
Figure 4:
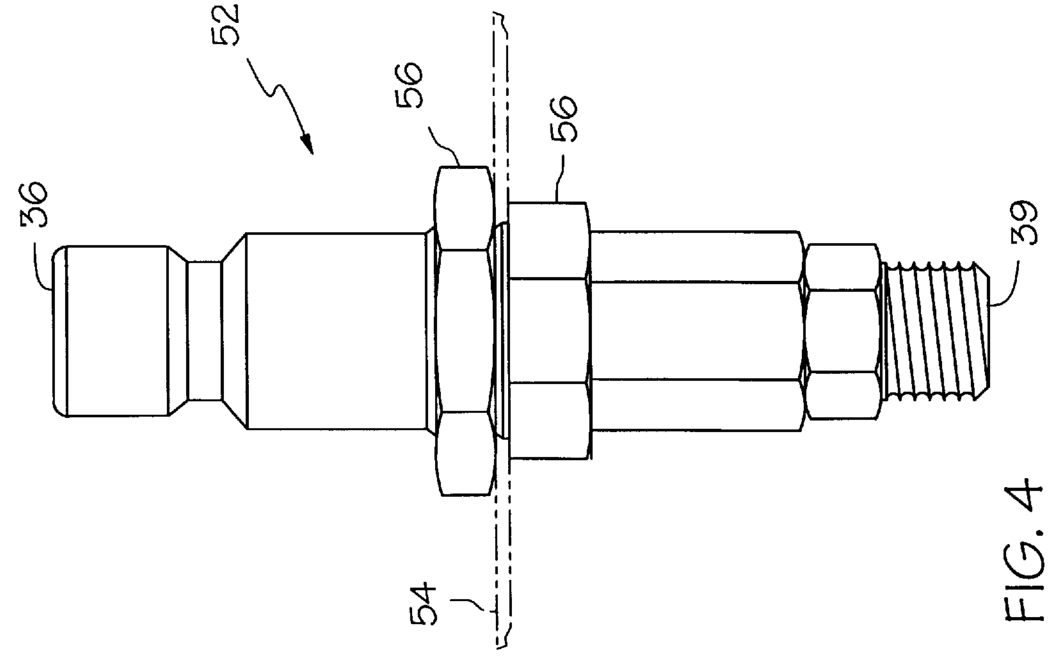
FIG. 4 is an illustration of a system for receiving and storing a fluid under pressure according to another embodiment of the present invention including uni-directional valve.

FIGS. 4 and 5, where like elements are identified with like reference numerals, illustrate a portion of another system for receiving and storing a fluid under pressure according to the present invention. A fluid flow passage 40 is mounted to a support structure 54 via mounting hardware 56 and extends from a fluid inlet port 36 to a fluid outlet port 39. As will be appreciated by those skilled in the art of pressurized fluid dispensing, the fluid inlet port 36 is designed to securely engage and conveniently disengage a fluid dispensing port of a fluid dispensing system and the fluid outlet port 39 is designed to securely couple to a fluid piping component or fluid hose (not shown). Any number of widely used inlet port, dispensing port, and outlet port designs may be utilized with the present invention, and, as such, are not disclosed herein in further detail.

A uni-directional valve 52 is positioned in the fluid flow passage 40 and includes the poppet 24, poppet guide 25, valve seat 26, and spring 27, as described above with reference to FIGS. 2 and 3, and is operative to permit fluid flow in a downstream direction from the inlet port 36 to the outlet port 39 and to restrict fluid flow in an upstream direction from the outlet port 39 to the inlet port 36. A fluid storage vessel 30 (not shown in FIGS. 4 and 5) is positioned downstream from the fluid flow passage 40 and is typically coupled to the fluid flow passage 40 via a fluid line, hose, or pipe.

As described above with reference to FIGS. 2 and 3, the fluid flow passage 40 defines a minimum flow area orifice 42 and a plurality of additional flow orifices 44. The minimum flow area orifice 42 has a cross sectional flow area which is smaller than a cross sectional flow area defined by the remainder of fluid flow passage orifices, i.e., the minimum flow area orifice 42 is the smallest flow passage orifice. A sonic nozzle 46, including a sonic nozzle body 48 defining the sonic nozzle 46, is positioned in the fluid flow passage 40 and defines the minimum flow area orifice 42.

The sonic nozzle 46 includes a convergent nozzle portion 46*a*, a divergent nozzle portion 46*b*, and a sonic nozzle throat 46*c* positioned between the convergent nozzle portion 46*a* and the divergent nozzle portion 46*b*. In one embodiment of the present invention, the sonic nozzle throat 46*c* has a diameter d of approximately 0.100" to 0.125" (2.54 mm to 3.175 mm) and a corresponding cross sectional area a which is $\pi(\frac{1}{2}d)^2$.

In operation, as described with reference to FIGS. 2–3 above, the fluid dispensing system supplies a fluid to the fluid inlet port 36 at a fluid inlet pressure and the downstream fluid storage vessel 30, which is in communication with the outlet port 39 via a fluid line, hose, or pipe, contains a fluid at a storage pressure. The storage pressure increases as fluid flows into the storage vessel 30. The sonic nozzle 42 is designed to maintain sonic fluid flow into the interior of the fluid storage vessel 30 where the increasing storage pressure is less than 50% of the inlet pressure and further where the storage pressure exceeds 50% of the inlet pressure. Specifically, as the storage pressure increases, sonic flow is maintained until the inlet pressure is merely about 5 to 10% higher than the storage pressure. Sonic flow is not lost until the storage pressure exceeds about 90–95% of the inlet pressure. In this manner, fill time is minimized because sonic flow into the storage vessel 30 is maintained until the storage vessel 30 is about 90–95% full.

Figure 6:
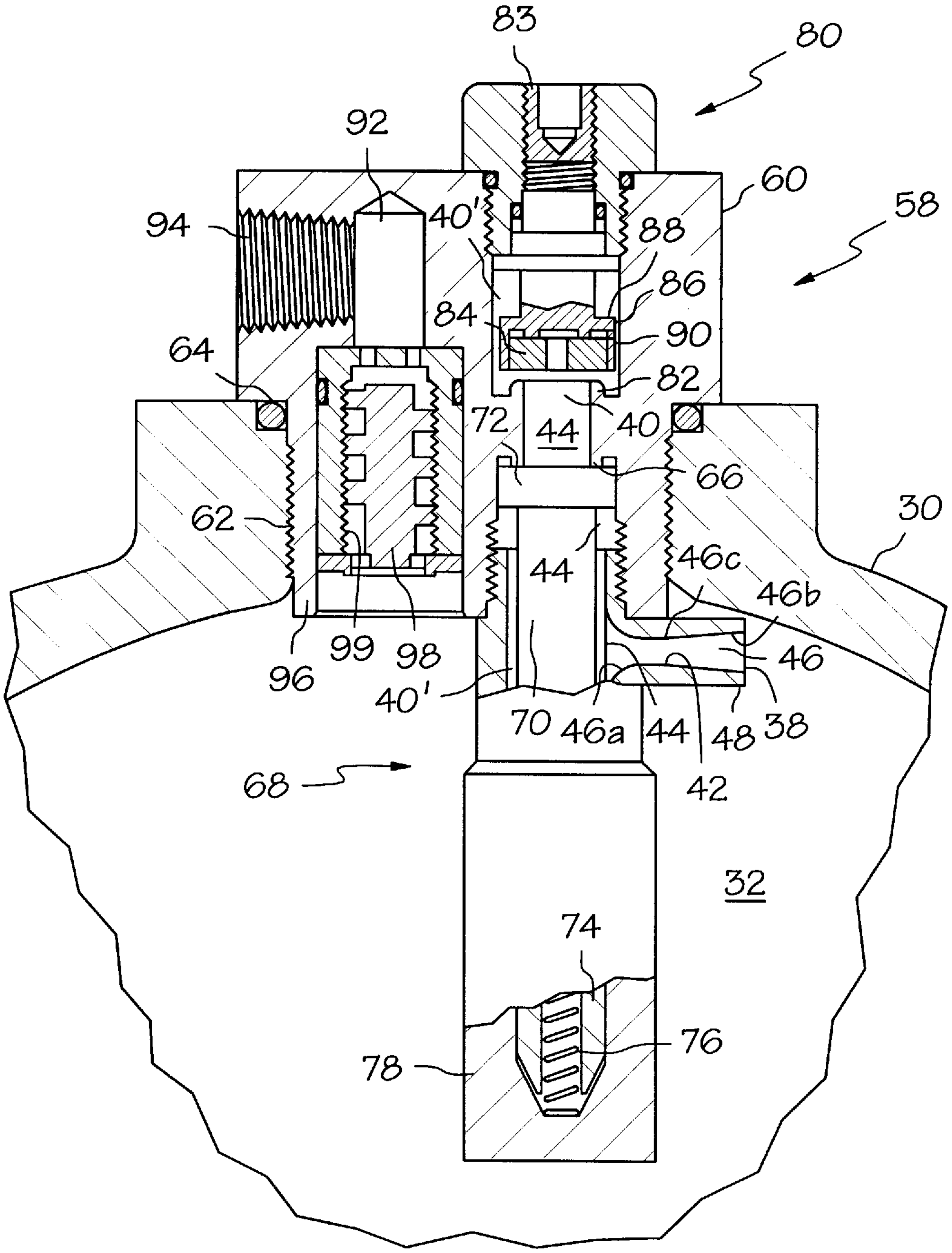
FIG. 6 is a view, partially in cross section and partially broken away, of a system for receiving, storing, and dispensing a fluid under pressure according to yet another embodiment of the present invention including a bi-directional valve.
Figure 7:
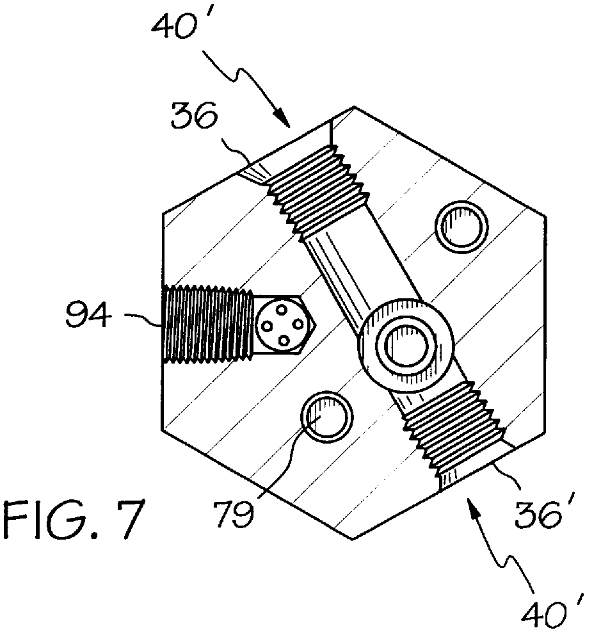
FIG. 7 is a top view of the bi-directional valve illustrated in FIG. 6.

FIGS. 6 and 7, where like elements are identified with like reference numerals, illustrate a system for receiving, storing, and dispensing a fluid under pressure. A bi-directional fluid flow passage 40', i.e., a fluid passage including at least one portion wherein fluid is permitted to flow in two opposite directions, defines at least one cross sectional flow area. The bi-directional fluid flow passage includes a fluid inlet port 36, a fluid outlet port 36', and a storage vessel port 38. A fluid storage vessel 30 defines a fluid storage volume 32. A bi-directional valve 58 is positioned in the bi-directional fluid flow passage 40' and is operative to permit bi-directional fluid flow to and from the storage vessel 32 through the storage vessel port 38.

The bi-directional valve 58 operates as described in U.S. Pat. No. 5,452,738, to Borland et al., issued Sep. 26, 1995, the disclosure of which is incorporated herein by reference, and comprises a valve body 60, external threads 62, a resilient O-ring 64, a valve seat 66, solenoid valve 68 which includes a poppet body 70, a poppet head 72, a solenoid core 74, a return spring 76, a solenoid coil 78, and an annular passage 79. The bi-directional valve 58 of the present invention also includes an optional manual lockdown valve 80 which can be tightened using a tool such as an Allen wrench (not shown) to seal against a second valve seat 82. As shown, a threaded stem 83 may be rotated to tighten a resilient gasket 84 against the valve seat 82 to seal gas flow passage 24. The resilient gasket 84, which may be fabricated of Nylon or other suitable material, is carried in a gasket holder 86 on the end of manual lockdown valve 80. Gasket holder 86 includes a top wall 88 and side wall 90 which together form an annular chamber with the gasket 54 mounted therein. The valve body 60 also includes a second gas flow passage 92 which communicates at one end with the interior of pressurized vessel 32 and at the other end communicates with a gas vent port 94 on the valve body 22. A thermally activated pressure relief device 96 is mounted in gas flow passage 92. The relief device 96 has a fusible alloy 98 therein which is held in place by internal threads 99. As described in U.S. Pat. No. 5,452,738, during normal operation of bi-directional valve 58, relief device 96 and fusible alloy 98 maintain a gas tight seal. If, however, the temperature adjacent the valve body or pressurized vessel rises above a predetermined limit, fusible alloy 98 melts, opening gas passage 92 and permitting the pressurized gas in vessel 32 to vent to the exterior.

The fluid flow passage 40' defines a minimum flow area orifice 42 and a plurality of additional flow orifices 44. The minimum flow area orifice 42 has a cross sectional flow area which is smaller than a cross sectional flow area defined by the remainder of fluid flow passage orifices, i.e., the minimum flow area orifice 42 is the smallest flow passage orifice. A sonic nozzle 46, including a sonic nozzle body 48 defining the sonic nozzle 46, is positioned in the fluid flow passage 40' and defines the minimum flow area orifice 42.

The sonic nozzle 46 includes a convergent nozzle portion 46*a,* a divergent nozzle portion 46*b,* and a sonic nozzle throat 46*c* positioned between the convergent nozzle portion 46*a* and the divergent nozzle portion 46*b*. In one embodiment of the present invention, the sonic nozzle throat 46*c* has a diameter d of approximately 0.100" to 0.125" (2.54 mm to 3.175 mm) and a corresponding cross sectional area a which is $\pi(\frac{1}{2}d)^2$.

In operation, the fluid dispensing system supplies a fluid to the fluid inlet port 36 at a fluid inlet pressure and the downstream fluid storage vessel 30 contains a fluid at a storage pressure. The storage pressure increases as fluid flows into the storage vessel 30. The sonic nozzle 42 is designed to maintain sonic fluid flow into the interior of the fluid storage vessel where the increasing storage pressure is less than 50% of the inlet pressure and further where the storage pressure exceeds 50% of the inlet pressure. Specifically, as the storage pressure increases, sonic flow is maintained until the inlet pressure is merely about 5 to 10% higher than the storage pressure. Sonic flow is not lost until the storage pressure exceeds about 90–95% of the inlet pressure. In this manner, fill time is minimized because sonic flow into the storage vessel 30 is maintained until the storage vessel 30 is about 90–95% full.

Figure 1:
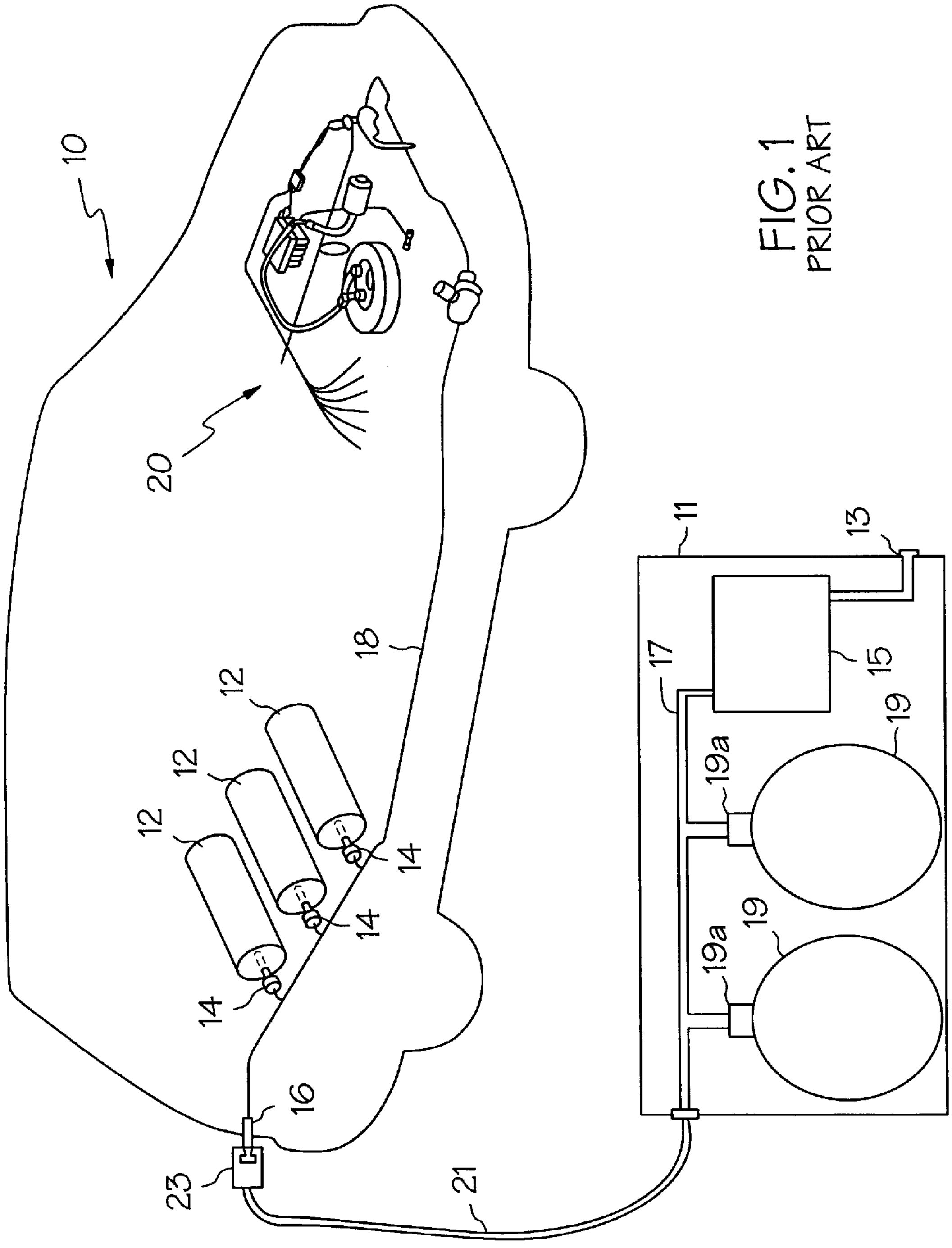
FIG. 1 PRIOR ART
FIG. 1 is a schematic representation of a conventional pressurized fluid transfer system.

According to the teachings of the present invention, and with further reference to the conventional pressurized fluid transfer system illustrated in FIG. 1, a system for supplying a fluid under pressure includes a supply storage vessel 19 located at a fluid supply station 11. A fluid flow passage including, e.g., a storage vessel valve 19*a,* the gas line 17, and the gas supply hose 21, extends from the supply storage vessel 19 to a fluid dispensing port, e.g. the supply nozzle 23. The fluid flow passage includes a minimum area flow passage orifice defined by the storage vessel valve 19*a*. As will be appreciated by one skilled in the art, the particular location of a minimum area flow passage orifice within the fluid supply station will vary depending upon the specific components utilized in the supply system. For example, a minimum flow passage orifice may be defined by the gas supply hose 21, the gas line 17, and/or the supply nozzle 23. Further, as will be appreciated by one skilled in the art, the specific components utilized within the supply system may define a plurality of equally sized minimum flow passage orifices.

The fluid dispensing port or supply nozzle 23, as will be appreciated by those skilled in the art, is designed or adapted to engage and disengage the fluid inlet port 16 and to dispense fluid to a downstream fluid receiving system, e.g. the vehicle 10. The downstream fluid receiving system includes a minimum area receiving system orifice defined by the fluid inlet port 16 or a plurality of orifices each having an area which is the minimum area orifice. As will be appreciated by one skilled in the art, the location of the minimum area receiving system orifice within the fluid receiving system or vehicle 10 will vary depending upon the specific components utilized in the receiving system or vehicle 10.

A sonic nozzle 46, see FIGS. 3, 5, 6, and 8 is positioned in the fluid flow passage. The sonic nozzle throat 46*c,* see FIGS. 3, 5, 6, and 8, defines a minimum sonic nozzle flow area wherein the minimum sonic nozzle flow area is smaller than respective flow areas defined by the minimum area flow passage orifice and the minimum area receiving system orifice. In one embodiment, the sonic nozzle throat has a diameter of approximately 0.100" to 0.125" (2.54 mm to 3.175 mm). Further, in one embodiment, the fluid flow passage comprises a system piping component 17 and the sonic nozzle body 48 is provided in a section of the piping component 17.

In operation, the system for supplying a fluid under pressure supplies a fluid at a fluid inlet pressure and a downstream fluid storage vessel, e.g. cylinder 12, contains a fluid at a storage pressure. The storage pressure increases as fluid flows into the storage vessel. The sonic nozzle 42 provided in the supply system is designed to maintain sonic fluid flow into the interior of the fluid storage vessel where the increasing storage pressure is less than 50% of the inlet pressure and further where the storage pressure exceeds 50% of the inlet pressure. Specifically, as the storage pressure increases, sonic flow is maintained until the inlet pressure is merely about 5 to 10 higher than the storage pressure. Sonic flow is not lost until the storage pressure exceeds about 90–95% of the inlet pressure. In this manner, fill time is minimized because sonic flow into the storage vessel is maintained until the storage vessel is about 90–95% full.

According to the teachings of the present invention, and with further reference to the conventional pressurized fluid transfer system illustrated in FIG. 1, a pressurized fluid transfer system includes a supply storage vessel 19 located at a fluid supply station 11 and a set of receiver storage vessels 12. A fluid flow passage including, e.g., a storage vessel valve (not shown), the gas line 17, the gas supply hose 21, the supply nozzle 23 or fluid dispensing port, the fluid inlet port 16, the fuel line 18, and the bi-directional valve 14, extends from the supply storage vessel 19 to the receiver storage vessels 12. The fluid flow passage includes a minimum flow area orifice positioned in the bi-directional valve 14, and a remainder of fluid flow passage orifices defined by the bi-directional valve 14, the fuel line 18, the fluid inlet port, the supply nozzle 23, the supply hose 21, and/or the gas line 17. As will be appreciated by one skilled in the art, the particular location of the minimum flow area orifice within the fluid transfer system may vary depending upon the specific components utilized in the system. For example, the minimum flow area orifice may alternatively be defined by the storage vessel valve 19*a* or the fluid inlet port 16.

The minimum flow area orifice is defined by the throat 46*c* of the sonic nozzle 46, see FIGS. 3, 5, 6, and 8. The minimum flow area orifice is smaller than respective flow areas defined by the remainder of fluid flow passage orifices. In one embodiment, the sonic nozzle throat has a diameter of approximately 0.100" to 0.125" (2.54 mm to 3.175 mm). Further, in one embodiment, the fluid flow passage comprises a system piping component 17 and the sonic nozzle body 48 is provided in a section of the piping component 17.

In operation, the pressurized fluid transfer system transfers a fluid at a fluid inlet pressure to a downstream fluid storage vessel, e.g. cylinder 12, containing a fluid at a storage pressure. The storage pressure increases as fluid flows into the storage vessel. The sonic nozzle 42 provided in the transfer system is designed to maintain sonic fluid flow into the interior of the fluid storage vessel where the increasing storage pressure is less than 50% of the inlet pressure and further where the storage pressure exceeds 50% of the inlet pressure. Specifically, as the storage pressure increases, sonic flow is maintained until the inlet pressure is merely about 5 to 10% higher than the storage pressure. Sonic flow is not lost until the storage pressure exceeds about 90–95% of the inlet pressure. In this manner, fill time is minimized because sonic flow into the storage vessel is maintained until the storage vessel is about 90–95% full.

Having described the invention in detail and by reference to preferred embodiments thereof, it will be apparent that modifications and variations are possible without departing from the scope of the invention defined in the appended claims.

What is claimed is:

1. A system for receiving and storing pressurized gas comprising:

a pressurized gas storage vessel defining a fluid storage volume;

a storage vessel valve defining a fluid flow passage extending from a valve inlet port to a storage vessel port, said storage vessel valve being operative to contain a gas under pressure in said pressurized gas storage vessel and permit fluid flow to said storage vessel through said storage vessel port, said fluid flow passage defining a minimum flow area orifice and at least one additional orifice; and a sonic nozzle positioned in said fluid flow passage.

2. A system for receiving and storing pressurized gas as claimed in claim 1 wherein said fluid flow passage comprises a passage body coupled to a sonic nozzle body, wherein said sonic nozzle body defines said sonic nozzle, and wherein said sonic nozzle body is an attachment to said passage body.

3. A system for receiving and storing pressurized gas as claimed in claim 2 wherein said sonic nozzle body is in the form of a threaded fitting and said sonic nozzle extends along the longitudinal axis of said threaded fitting.

4. A system for receiving and storing pressurized gas as claimed in claim 1 wherein said sonic nozzle defines said minimum flow area orifice, wherein said at least one additional orifice comprises a remainder of fluid flow passage orifices, and wherein said minimum flow area orifice has a cross sectional flow area which is smaller than a cross sectional flow area defined by said at least one additional orifice.

5. A system for receiving and storing pressurized gas as claimed in claim 1, wherein said sonic nozzle includes a convergent nozzle portion, a divergent nozzle portion, and a sonic nozzle throat positioned between said convergent nozzle portion and said divergent nozzle portion.

6. A system for receiving and storing pressurized gas as claimed in claim 5 wherein said sonic nozzle throat has a diameter of approximately 0.100" to 0.125" (2.54 mm to 3.175 mm).

7. A system for receiving and storing pressurized gas as claimed in claim 1 wherein said pressurized gas storage vessel contains a fluid at a storage pressure, said valve inlet port receives a fluid at an inlet pressure, and said sonic nozzle is designed to maintain sonic fluid flow into said pressurized gas storage vessel at least where said storage pressure is greater than 50% of said inlet pressure.

8. A system for receiving and storing pressurized gas as claimed in claim 1 wherein said pressurized as storage vessel contains a fluid at a storage pressure, said valve inlet port receives a fluid at an inlet pressure, and said sonic nozzle is designed to maintain sonic fluid flow into said pressurized gas storage vessel at least where said inlet pressure is about 5 to 10% higher than said storage pressure.

9. A system for receiving and storing pressurized gas comprising:

a fluid flow passage extending from a fluid inlet port to a fluid outlet port, said fluid inlet port being designed to engage and disengage a fluid dispensing port, and said fluid flow passage defining a minimum flow area orifice and at least one additional orifice;

a pressurized gas storage vessel positioned downstream from said fluid flow passage;

a uni-directional valve positioned in said fluid flow passage and operative to permit fluid flow in a downstream direction from said inlet port to said outlet port, restrict fluid flow in an upstream direction from said outlet port to said inlet port, and contain a gas under pressure in said pressurized gas storage vessel; and a sonic nozzle positioned in said fluid flow passage.

10. A system for receiving and storing pressurized gas as claimed in claim 9 wherein said sonic nozzle defines said minimum flow area orifice, wherein said at least one additional orifice comprises a remainder of fluid flow passage orifices, and wherein said minimum flow area orifice has a cross sectional flow area which is smaller than a cross sectional flow area defined by said at least one additional orifice.

11. A system for receiving and storing pressurized gas as claimed in claim 9, wherein said sonic nozzle includes a convergent nozzle portion, a divergent nozzle portion, and a sonic nozzle throat positioned between said convergent nozzle portion and said divergent nozzle portion.

12. A system for receiving and storing pressurized gas as claimed in claim 11 wherein said sonic nozzle throat has a diameter of approximately 0.100" to 0.125" (2.54 mm to 3.175 mm).

13. A system for receiving and storing pressurized gas as claimed in claim 9 wherein said pressurized gas storage vessel contains a fluid at a storage pressure, said fluid inlet port receives a fluid at an inlet pressure, and said sonic nozzle is designed to maintain sonic fluid flow into said pressurized gas storage vessel at least where said storage pressure is greater than 50% of said inlet pressure.

14. A system for receiving and storing pressurized gas as claimed in claim 9 wherein said pressurized gas storage vessel contains a fluid at a storage pressure, said fluid inlet port receives a fluid at an inlet pressure, and said sonic nozzle is designed to maintain sonic fluid flow into said pressurized gas storage vessel at least where said inlet pressure is about 5 to 10% higher than said storage pressure.

15. A system for receiving, storing, and dispensing pressurized gas comprising:

a bi-directional fluid flow passage having a fluid inlet port and a pressurized gas storage vessel port and defining at least one cross sectional flow area;

a pressurized gas storage vessel defining a fluid storage volume in communication with said pressurized gas storage vessel port;

a bi-directional valve positioned in said bidirectional fluid flow passage and operative to permit bi-directional fluid flow to and from said storage vessel through said storage vessel port and contain a gas under pressure in said pressurized gas storage vessel; and a sonic nozzle positioned in said bi-directional fluid flow passage.

16. A system for receiving, storing, and dispensing pressurized gas as claimed in claim 15 wherein said sonic nozzle defines a minimum flow area orifice, and wherein said minimum flow area orifice has a cross sectional flow area which is smaller than said at least one cross sectional flow area defined by said bi-directional fluid flow passage.

17. A system for receiving, storing, and dispensing pressurized gas as claimed in claim 15, wherein said sonic nozzle includes a convergent nozzle portion, a divergent nozzle portion, and a sonic nozzle throat positioned between said convergent nozzle portion and said divergent nozzle portion.

18. A system for receiving, storing, and dispensing pressurized gas as claimed in claim 17 wherein said sonic nozzle throat has a diameter of approximately 0.100" to 0.125" (2.54 mm to 3.175 mm).

19. A system for receiving, storing, and dispensing pressurized gas as claimed in claim 15 wherein said bi-directional fluid flow passage further comprises a fluid outlet port.

20. A system for receiving, storing, and dispensing pressurized gas as claimed in claim 15 wherein said bi-directional valve comprises a bi-directional solenoid valve.

21. A system for receiving, storing, and dispensing pressurized gas as claimed in claim 15 wherein said pressurized gas storage vessel contains a fluid at a storage pressure, said fluid inlet port receives a fluid at an inlet pressure, and said sonic nozzle is designed to maintain sonic fluid flow into said pressurized gas storage vessel at least where said storage pressure is greater than 50% of said inlet pressure.

22. A system for receiving, storing, and dispensing pressurized gas as claimed in claim 15 wherein said pressurized gas storage vessel contains a fluid at a storage pressure, said fluid inlet port receives a fluid at an inlet pressure, and said sonic nozzle is designed to maintain sonic fluid flow into said pressurized gas storage vessel at least where said inlet pressure is about 5 to 10% higher than said storage pressure.

23. A system for supplying pressurized gas comprising:

a pressurized gas supply storage vessel;

a fluid flow passage extending from said pressurized gas supply storage vessel to a fluid dispensing port, said fluid flow passage including a minimum area flow passage orifice, said fluid dispensing port being adapted to dispense a pressurized gas to a downstream pressurized gas receiving system, and said downstream pressurized gas receiving system including a minimum area receiving system orifice; and a sonic nozzle positioned in said fluid flow passage, said sonic nozzle including a convergent nozzle portion, a divergent nozzle portion, and a sonic nozzle throat positioned between said convergent nozzle portion and said divergent nozzle portion, said sonic nozzle throat defining a minimum sonic nozzle flow area, wherein said minimum sonic nozzle flow area is smaller than respective flow areas defined by said minimum area flow passage orifice and said minimum area receiving system orifice.

24. A system for supplying pressurized gas as claimed in claim 23 wherein said fluid dispensing port is designed to engage and disengage a fluid inlet port.

25. A system for supplying pressurized gas as claimed in claim 23 wherein said sonic nozzle throat has a diameter of approximately 0.100" to 0.125" (2.54 mm to 3.175 mm).

26. A system for supplying pressurized gas as claimed in claim 23 wherein said fluid flow passage comprises a system piping component and a sonic nozzle body provided in a section of said piping component.

27. A pressurized gas transfer system comprising:

a pressurized gas supply storage vessel;

a pressurized gas receiver storage vessel;

a fluid flow passage extending from said pressurized gas supply storage vessel to said pressurized gas receiver storage vessel and defining a minimum flow area orifice and at least one additional orifice, wherein said at least one additional orifice comprises a remainder of fluid flow passage orifices;

a sonic nozzle comprising a convergent nozzle portion, a divergent nozzle portion, and a nozzle throat positioned between said convergent nozzle portion and said divergent nozzle portion, said nozzle throat defining said minimum flow area orifice, and said minimum flow area orifice having a cross sectional flow area which is smaller than said at least one additional orifice.

28. A pressurized gas transfer system as claimed in claim 27 wherein said fluid flow passage comprises a fluid dispensing port and a fluid inlet port, wherein said fluid dispensing port is designed to engage said fluid inlet port.

29. A pressurized gas transfer system as claimed in claim 27 wherein said sonic nozzle throat has a diameter of approximately 0.100" to 0.125" (2.54 mm to 3.175 mm).

30. A pressurized gas transfer system as claimed in claim 27 wherein said receiver storage vessel contains a fluid at a receiver storage pressure, said pressurized gas supply storage vessel contains a fluid at a supply pressure, and said sonic nozzle is designed to maintain sonic fluid flow into said pressurized gas storage vessel at least where said receiver storage pressure is greater than 50% of said supply pressure.

31. A pressurized gas transfer system as claimed in claim 27 wherein said receiver storage vessel contains a fluid at a receiver storage pressure, said pressurized gas supply storage vessel contains a fluid at a supply pressure, and said sonic nozzle is designed to maintain sonic fluid flow into said pressurized gas storage vessel at least where said supply pressure is about 5 to 10% higher than said receiver storage pressure.

32. A pressurized gas transfer system as claimed in claim 27 wherein said fluid flow passage comprises a system piping component and a sonic nozzle body provided in a section of said piping component.

* * * * *